April 1, 1941.                T. A. PETERMAN                2,236,696
                               VEHICLE DRIVE
                           Filed Oct. 4, 1938          4 Sheets-Sheet 1
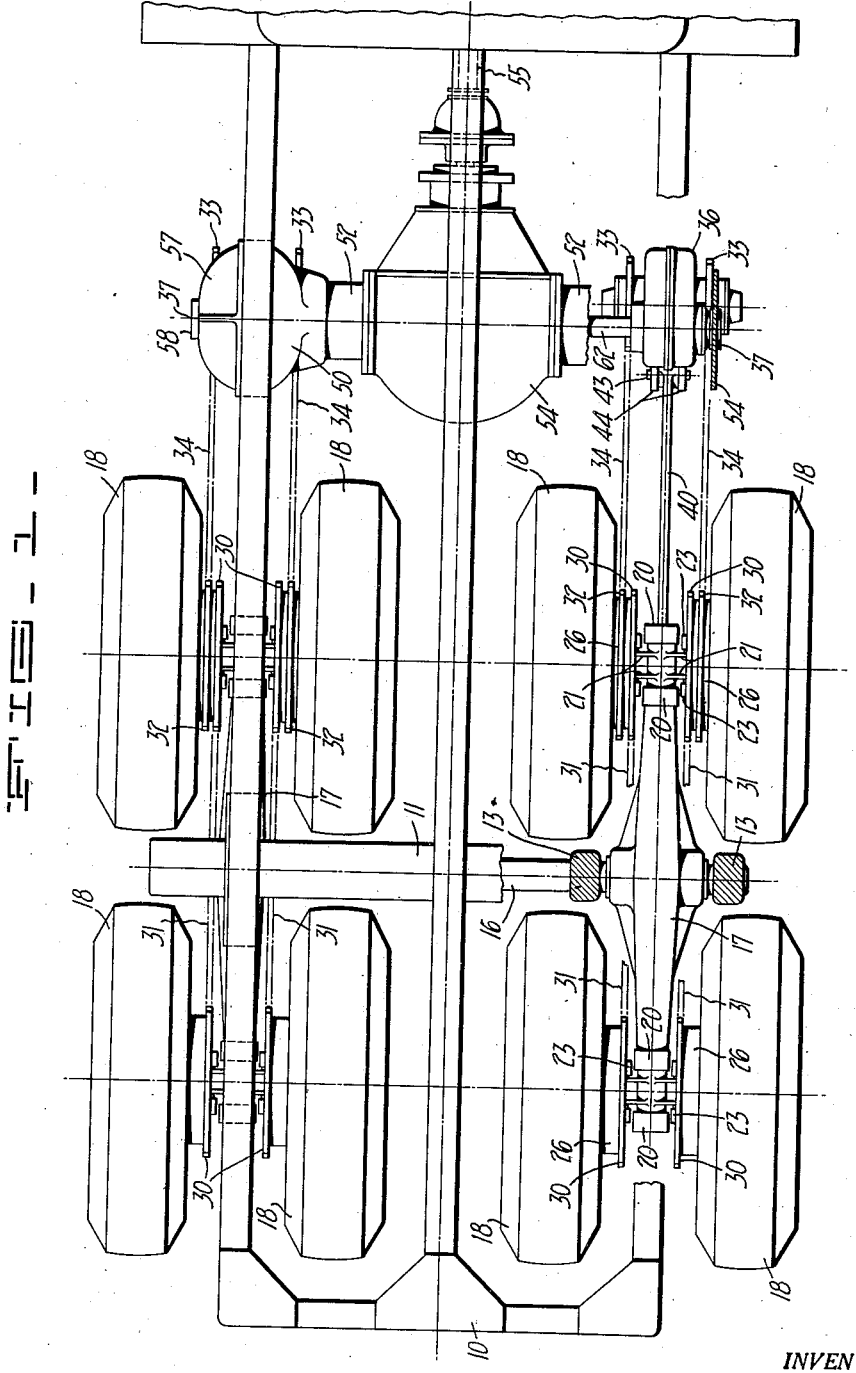
INVENTOR.
Theodore A. Peterman
BY
ATTORNEY

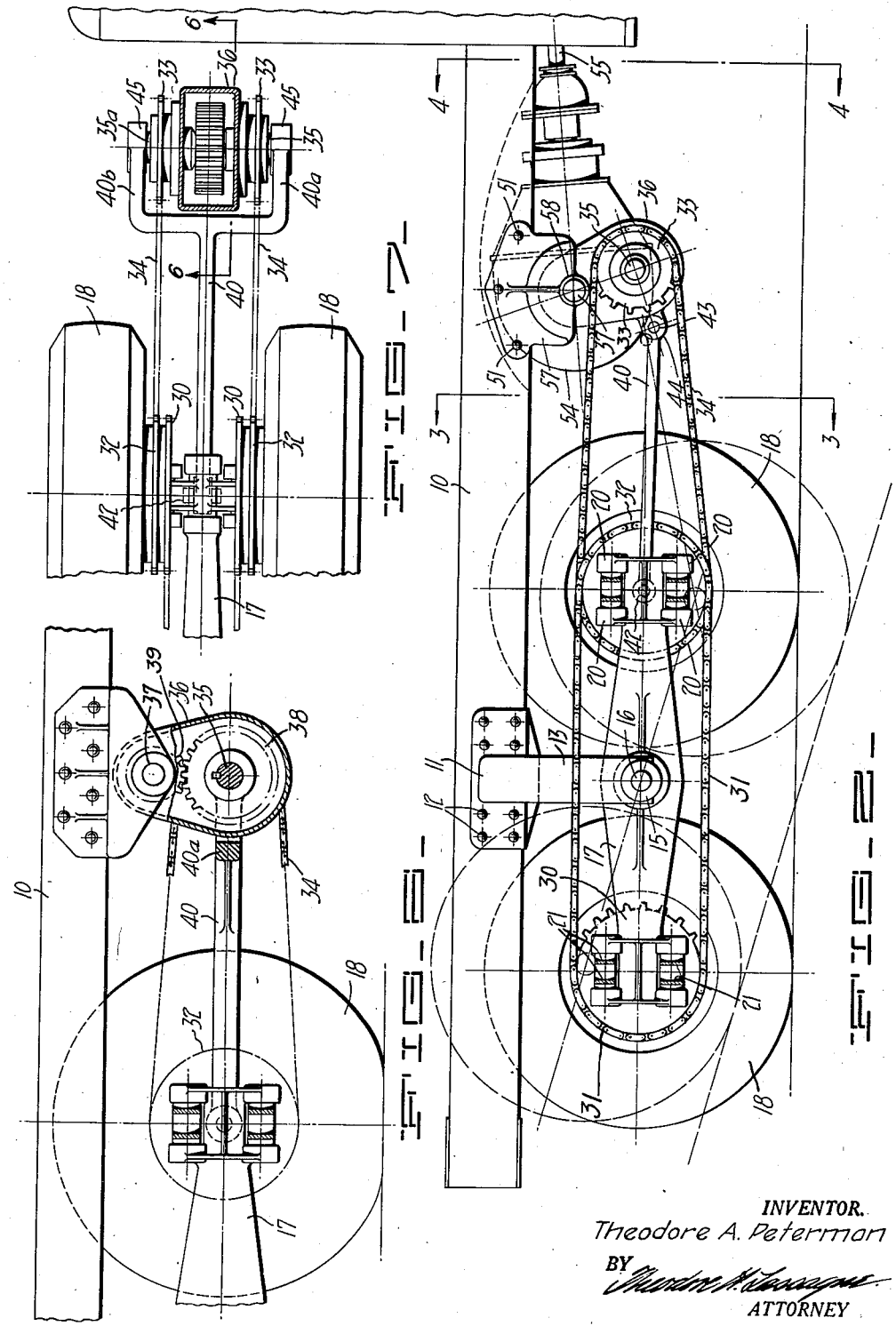

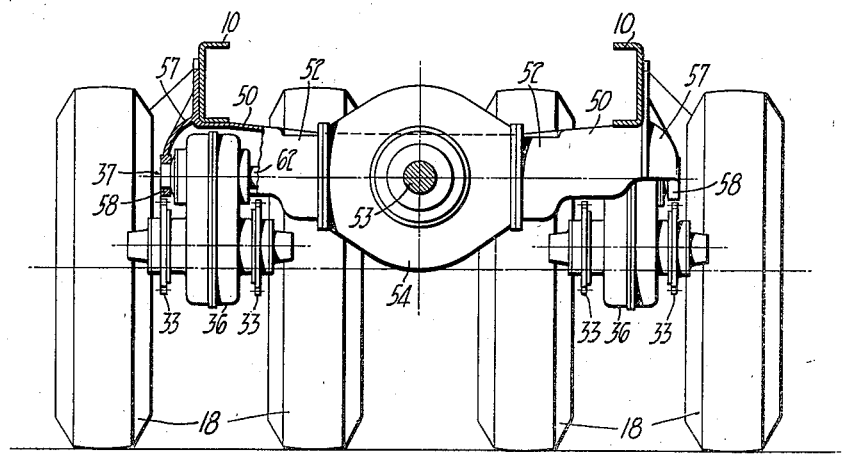
FIG_4_
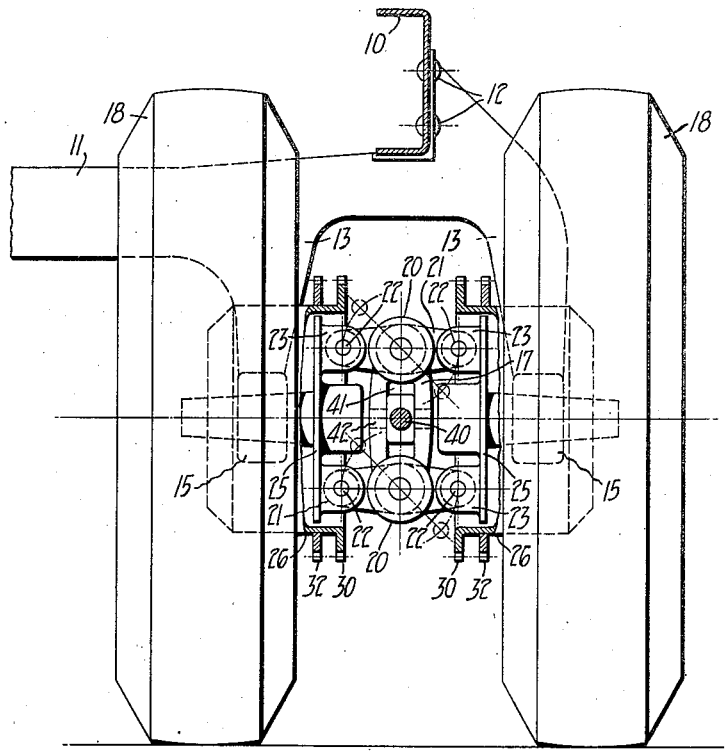
FIG_3_
INVENTOR.
Theodore A. Peterman
BY
ATTORNEY

April 1, 1941. T. A. PETERMAN 2,236,696
VEHICLE DRIVE
Filed Oct. 4, 1938 4 Sheets-Sheet 4
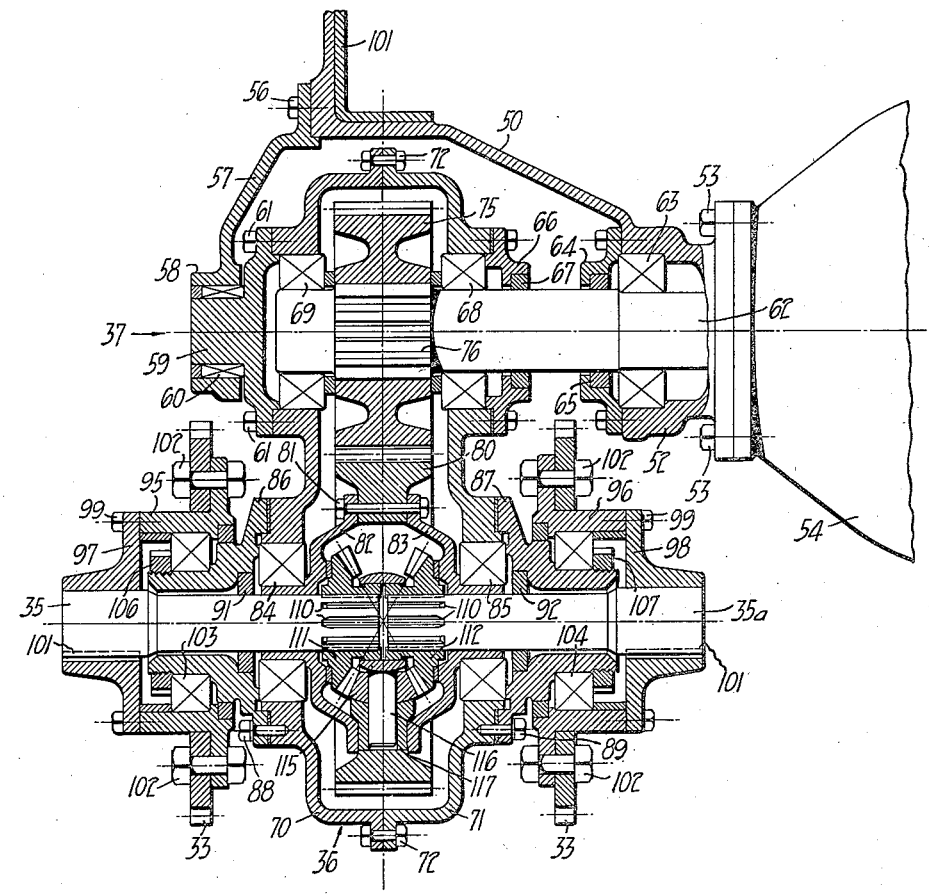
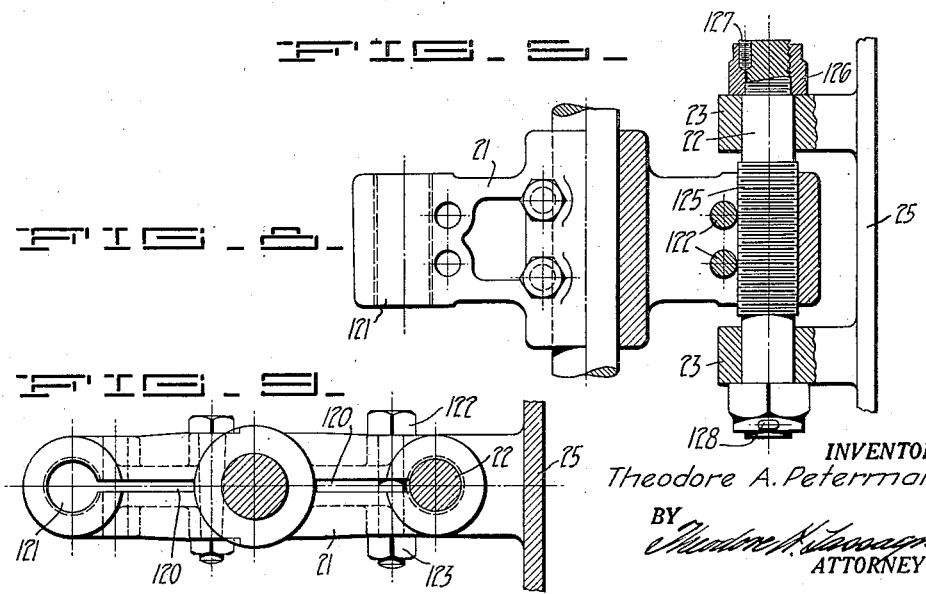
INVENTOR.
Theodore A. Peterman
BY
ATTORNEY.

Patented Apr. 1, 1941

2,236,696

UNITED STATES PATENT OFFICE 2,236,696

VEHICLE DRIVE

Theodore A. Peterman, Tacoma, Wash.

Application October 4, 1938, Serial No. 233,198

9 Claims. (Cl. 180—22)

The present invention relates to driving mechanism for multiple wheel vehicles, and more particularly to driving mechanism for vehicles in which a plurality of driving wheels are suspended for independent movement with respect to the frame.

In vehicles having from four to eight or more wheels suspended upon equalizing beams pivotally mounted upon the frame of the vehicle, the transmission of driving power to a plurality of such wheels has, heretofore, been effected by mechanism extending through the pivotal mounting of the equalizer beams upon the frame. This has necessitated the use of specially designed equalizer beams and mountings therefor having drive transmitting mechanism incorporated therein, and has usually required specially designed equalizer beam construction designed to provide mountings for outboard differential mechanisms adapted to effect fore and aft or transverse differentiation of the drive to the several wheels.

For these reasons it has never been feasible to add driving mechanism to wheel suspensions of this type primarily designed merely as wheel suspensions and adapted for use on trailers and similar wheeled vehicles in which it is not desired to apply driving power to the wheels.

The present invention has as an object the provision of a driving mechanism for such multiple wheel vehicles, which is adapted for application to wheel suspensions primarily designed without reference to whether or not driving power is to be transmitted to the wheels thereof. This permits the standardization of wheel suspension parts, which may, according to the present invention, be used either upon trailer structures or truck structures, driving mechanism being merely added thereto when it is desired to transmit drive to the wheels, and no modification of the wheel suspension structure itself, except the addition of sprockets or similar drive receiving elements to the wheels which it is desired to drive, being necessary.

A further object of the invention is the provision of mechanism for effecting transverse differentiation between the driving wheels of a vehicle of the class described.

Additional objects of the invention include the provision of a tractive arrangement for such multiple wheel vehicles combining the advantages of multiple wheel drive with the advantages of independent wheel suspension, and the provision of an improved simple and dependable transmission for driving such vehicles.

Additional objects and advantages of the invention will appear from the following description of specific embodiments thereof when read in connection with the accompanying drawings in which:

Figure 1 is a plan view of the rear portion of a truck embodying the present invention, the truck bed being removed to show the driving arrangement, and a portion of the frame being broken away adjacent the right side to better illustrate the wheel suspension.

Figure 2 is a side elevational view of the construction shown in Figure 1 with the outer wheels removed and the suspension links sectioned to better expose certain of the mechanism to view.

Figure 3 is a sectional view in detail of one of the suspensions illustrated in Figure 1, taken on the line 3—3 of Figure 2, certain elements being broken away to expose underlying details to view.

Figure 4 is a sectional view of the suspension illustrated in Figure 1, taken on the line 4—4 of Figure 2, with certain portions broken away to better illustrate underlying mechanism.

Figure 5 is a detailed sectional view of one of the outboard differential mechanisms employed for transmitting the drive.

Figure 6 is a side elevational view, partly in section, of a modified construction contemplated by the present invention.

Figure 7 is a plan view, partly in section, of the modification illustrated in Figure 6.

Figure 8 is a detail view in plan and partly sectioned, of a suspension link and hub member assembly.

Figure 9 is a detail view in side elevation of said suspension link.

As illustrated in Figures 1 and 2, the rear portion of the vehicle, the front of which may be of any conventional construction, comprises in general a rigid main frame 10 having depending pivotal supports 13 for a pair of longitudinally extending equalizer beams 17, on each end of which a pair of road wheels 18 is suspended by a parallel linkage suspension, the arrangement being such as to permit independent vertical movement of each of the wheels with respect to all of its associated wheels. This much of the arrangement is adapted for use in a trailer structure in which driving power is not applied to the road wheels as well as in a truck structure as described in connection with the description of the present invention.

In order to adapt this construction for power drive without modification of the wheel suspension itself in any way, drive sprockets 30 and 32 are provided upon the hub structure of each of the wheels 18, and a main differential mechanism 54 of conventional construction is disposed forwardly of the wheel mounting and centrally of the truck frame, and connected by means of transverse drive shafts, to driving sprockets 33 mounted on the frame and connected with the driving sprockets 32 of the forward wheels.

In order to insure that the driving chains connecting the sprockets 33 with the forward wheels will not be slackened or taughtened by the independent vertical movement of the forward wheels, the said sprockets are so mounted on the frame as to be movable thereon without interrupting their drive and a connection is provided between the forward end of the equalizer beam and each of the sprocket mountings so that the movement of each equalizer beam will effect a compensating movement of its associated sprocket mounting sufficient to maintain the driving chain connecting it with the forward wheels at a substantially uniform tension. For geometrical accuracy the pivotal connection between the equalizer beam and the sprocket mounting should preferably take the form illustrated in Figures 6 and 7 in which the pivotal connection is made to a point coaxial with the axis of the driving sprocket; but for practical purposes it has been found satisfactory to make the pivotal connection to the sprocket mounting at a point closely adjacent thereto, as illustrated in Figure 2.

Referring in detail to Figures 1 and 2, the main frame 10, of structural steel members bolted or welded together, is supported adjacent its rear end by a bolster frame 11 extending transversely of the main frame and secured thereto by means such as rivets 12. Integral with the bolster frame 11 are depending extensions 13 provided adjacent their lower ends with split clamps 15 in which a cross shaft 16 is secured. Equalizer beams 17 are pivotally mounted on the cross shaft, one being disposed at each side of the frame 10 between the extensions 13 of the adjacent bolster frame 11.

A pair of road wheels 18 is mounted adjacent each end of the equalizer beam 17 by means constituting a parallel linkage suspension. For this purpose pivotal mountings in the form of bearings 20 are disposed adjacent each end of the equalizer beam 17 and suspension links 21 are pivotally mounted in said bearings 20, one of said links lying above the equalizer beam 17 and the other below it, at each end. The adjacent ends of the suspension links 21 are pivotally connected as at 22 (Figure 3) to lugs 23 of hub members 25 upon which hub drums 26 integral with road wheels 18 are rotatably mounted.

This arrangement is such as to permit independent vertical movement of each of the road wheels 18 with respect to each of the other road wheels, so that upon encountering an irregularity in the roadway, any of the wheels may rise or fall vertically with respect to any or all of the others without either displacing any of the other wheels vertically or tipping it out of its normal vertical rolling plane, and the term "parallel linkage suspension" as used herein comprises the class of wheel suspensions operating in this manner, and is not intended to be construed as limited to the specific structure described above.

Suppose, for example, that one of the road wheels 18 encounters a depression such that it is lowered a given distance below the plane upon which the remaining wheels stand. The links 21 upon which the wheel is suspended will be rocked upon their pivots 22 on the transversely aligned road wheel 18 and the end of the equalizer beam 17 upon which the lowered wheel is mounted, being pivotally connected to the equalizer links 21, half way between the above mentioned road wheels 18, will be lowered half the distance the wheel was lowered. The bolster frame 11 being pivoted to the equalizer beam 17 half way between the fore and aft pairs of road wheels 18, will be lowered only one-quarter of the distance that the wheel was lowered.

The structure thus far described is susceptible of use as an equalizing wheel suspension for trailer vehicles in which it is not desired to apply power to the road wheels to drive the vehicle. According to the present invention, however, power for driving the vehicle may be transmitted to road wheels so mounted upon equalizing suspension devices of the character described, without necessitating any modification of the structure ordinarily used by the manufacturer for constructing trailer vehicles. This is advantageous not only in converting trailer vehicles to render them capable of power drive, but permits standardization of parts by the manufacturer so that the same parts may be used both in power driven and trailer vehicles.

The longitudinally aligned wheels of the pairs of wheels mounted upon each of the equalizer beams 17 are connected together so that driving power transmitted to one of the wheels will also be transmitted to the wheel longitudinally aligned therewith. For this purpose the hub drums 26 of the wheels are provided with sprockets 30, preferably formed integrally with the hub drum, as shown in Figure 3, and a chain 31 extends over the longitudinally aligned sprockets 30 connecting the aligned wheels 18 together.

Means are also provided for transmitting power from driving elements mounted on the frame of the vehicle to the forward road wheels, and for maintaining said driving connection during movement of the road wheels and the equalizer beam incidental to passage over rough terrain. For this purpose the hub drums 26 of the forward pair of road wheels 18, are provided with additional sprockets 32 (Figure 3) secured thereto as by welding, and connected to driving sprockets mounted on the vehicle frame by means such as driving chains 34 (Figure 1).

In order to maintain the chain 34 at the proper tension during vertical movement of the forward wheels 18, the driving sprockets 33 are so mounted on the vehicle frame as to permit them to move longitudinally thereof. For this purpose each of the sprockets 33 (Figure 2) is mounted upon a shaft 35 rotatably mounted in a housing 36 which in turn, is pivotally mounted for rocking movement about an axis 37 on the main frame 10 of the vehicle.

Means for effecting fore and aft movement of the sprockets 33 in response to rocking movement of the associated equalizer beam 17 are provided preferably in the form of a thrust bar 40, one end of which is pivotally connected to the equalizer beam, within a recess 41 (Figure 3) formed in one end thereof, by means such as pivot pin 42, and the other end of which is pivotally connected to the housing 36 by means such as pivot pins 43 (Figure 1) connecting one end of the bar 40 with ears 44 formed integrally with the housing 36.

This arrangement is such that any rising or falling movement of the ends of equalizer beam 17 adjacent the driving mechanism, will effect compensating fore and aft movement of the drive sprockets 33 so as to maintain the driving chain 34 at the proper tension.

An arrangement which is geometrically more accurate is illustrated in Figures 6 and 7 in which the bar 40 is connected to the equalizer beam 17 in the same manner as illustrated in Figures 2 and 3, but is pivotally connected to the housing 36 at points coaxial with the drive sprockets 33. For this purpose the bar 40 is bifurcated adjacent its forward end, the two arms 40a and 40b thereof each being pivotally connected to the housing 36, being formed with bearing ends 45 embracing the ends of shaft 35 and 35a upon which the sprockets 33 are mounted.

In the case of vehicles provided with a simpler wheel suspension in which no transverse differentiation between transversely aligned wheels mounted upon one side of the vehicle is required, driving sprockets 33 (Figures 6 and 7) may be driven by means of a simple geared connection between the shaft 35 upon which sprockets 33 and gear 38 are mounted and a gear 39 mounted upon a shaft on the axis 37 meshing with gear 38, and powered from the standard type of differential mechanism 54 located centrally of the vehicle. In multiple wheel vehicles of the type disclosed herein, however, it is desirable to effect transverse differentiation between the transversely aligned wheels 18 on each of the equalizer beams 17, and for this purpose outboard differential mechanisms are disposed within the pivotally mounted housings 36 hereinabove referred to.

These outboard differential mechanisms are of similar construction, and as shown in Figure 5, each is supported on the main frame 10 of the vehicle by a bracket 50 secured to the main frame by means such as rivets 51 (Figure 2) and provided adjacent its inner end with a tubular portion 52 secured, by means such as bolts 53, to the housing 54 of a conventional type of differential gearing, driven by means of shaft 55 (Figures 1 and 2), by the engine of the vehicle. Secured to the bracket 50 by means such as bolts 56, is a supplemental bracket 57 having a tubular lower portion 58 which provides a bearing support for a trunnion member 59 supported therein on conventional roller bearings 60 which serves as a supporting member for one side of the differential housing 36, being secured thereto by means such as bolts 61. A drive shaft 62, driven from one side of the main differential mechanism, extends from the housing 54 thereof through the tubular portion 52 of the bracket 50 into an aperture in the opposite side of the outboard differential housing 36 sealed by cap member 66 and oil seal 67. Roller bearings 68 and 69 disposed between the shaft 62 and the interior of the housing 36, render the housing freely rockable upon the shaft 62, which, together with the trunnion member 59 constitutes the pivotal support for the housing.

The differential housing 36 is formed in two similar halves 70 and 71 secured together by means such as bolts 72 and encloses a driving pinion 75 secured as by splines 76 to shaft 62. Disposed in the lower portion of the differential housing 36 and meshing with the pinion 75 is a ring gear 80 secured by means such as bolts 81 to spiders 82 and 83, rotatably mounted upon roller bearings 84 and 85 retained within the housing 36 by sprocket hubs 86 and 87 secured to the housing by means such as bolts 88 and 89, said hubs also serving to retain oil seals 91 and 92 so as to render the housing 36 oil tight.

Rotatably mounted upon the sprocket hubs 86 and 87, respectively, are sprocket hub drums 95 and 96 connected to shafts 35 and 35a, respectively, by flanges 97 and 98 which are secured to the sprocket hub drums by means such as bolts 99, and keyed to the respective shafts as indicated at 101. Drive sprockets 33 are secured to the drums 95 and 96, respectively, by means such as bolts 102, and roller bearings 103 and 104 are disposed between the drums 95 and 96 and the hubs 86 and 87, respectively, being secured in operating position by screw collars 106 and 107 secured on the threaded ends of hubs 86 and 87, respectively.

The adjacent ends of shafts 35 and 35a, respectively, have secured thereto by means such as splines 110, bevel gears 111 and 112 meshing with planetary gears 115, the hubs 116 of which are rotatably mounted in sockets 117 formed in the interior of ring gear 80. This entire assembly of gears 80, 111, 112, and 115 thus constitutes a planetary differential gearing for effecting transverse differentiation between the two driving sprockets 33 which, as hereinabove described, are connected to drive transversely aligned wheels disposed on one side of the vehicle.

The entire differential assembly together with the differential housing 36 is, moreover, capable of rocking movement about the axis 37 during which movement the ring gear 80 rolls in mesh with the driving pinion 75 in compensating for rocking movement of the equalizer beam 17 on which the driving wheels 18 of the vehicle are suspended.

In this way the transversely aligned pairs of road wheels 18, upon which the weight of the vehicle is always equally distributed due to the provision of the parallel linkage and equalizer beam suspension described in detail in the foregoing specification, may be used as driving wheels, the driving power being properly differentiated during turning movements of the vehicle by the main and outboard differential mechanisms described.

Provision is preferably made for adjustment of the several chain drive connections in order to compensate for wear. For this purpose, as shown in Figures 8 and 9, each of the suspension links 21 is slotted as at 120, said slot communicating with the aperture 121 which receives the pivot pin 22, and clamping bolts 122, extending through holes in the link and fitted with nuts 123, are provided for clamping the pivot pins 22 in adjusted position.

In order to provide for accurate and easy adjustment, the middle portion of pins 22 is preferably threaded on the interior surface of the aperture 121 so that longitudinal adjustment of each pin may be effected by loosening nuts 123 and turning pins 22. This turning of the pins is facilitated by the provision of nuts 126 threaded on each end of each pin 22 and normally locked thereto by lock screw 127 and a cotter pin 128 respectively.

The apertured lugs 23 of hub members 25 are pivoted on pins 22 abutting nuts 126, but the spacing of said lugs is greater than the width of the portion of link 21 lying between them. It will be apparent, therefore, that longitudinal adjustment of pins 22 will effect corresponding longitudinal adjustment of the hub member 25 and road wheels so that the driving chains may be tautened or loosened by this arrangement.

It will be apparent to those skilled in the art that certain features of the invention may be utilized independently of others with advantage, and that many modifications may be made in the details of construction disclosed herein without departing from the actual invention disclosed. It may be pointed out, for instance, without attempting to exhaustively enumerate alternatives, that the mounting of power transmission devices upon the frame with freedom for movement fore and aft of the vehicle, may be used to transmit power to vehicles having but two wheels on each side where said wheels are mounted at opposite ends of an equalizer beam of the general construction disclosed, and that in such an embodiment of the invention the provision of the outboard differential mechanism could be readily dispensed with. In view of these facts, it will be understood that the invention is not to be considered as limited to the specific embodiment disclosed, except as is required by the prior art and by the spirit of the appended claims.

I claim:

1. In a motor vehicle, a frame, a plurality of longitudinally extending equalizing devices pivotally mounted on said frame, a plurality of transverse pairs of road wheels, parallel linkage suspensions connecting said transverse pairs of wheels with said devices, a plurality of differential mechanisms suspended on said frame for movement longitudinally thereof with respect to said devices, means for driving said differential mechanisms, driving connections between each of said differential mechanisms and one of said transverse pairs of wheels mounted on one of said devices, and means operated by each of said equalizing devices, upon pivotal movement thereof on said frame, for moving one of said differential mechanisms longitudinally with respect to said frame whereby a substantially uniform separation is maintained between each of said differential mechanisms and the wheels connected thereto.

2. In a motor vehicle, a frame, a plurality of longitudinally extending equalizing devices pivotally mounted on said frame, a plurality of transverse pairs of road wheels, parallel linkage suspensions connecting said transverse pairs of wheels with said devices, a plurality of differential mechanisms suspended on said frame for movement longitudinally thereof with respect to said devices, means for driving said differential mechanisms, driving connections between one side of each of said differential mechanisms and longitudinally corresponding wheels of said pairs, driving connections between the other side of each of said differential mechanisms and other longitudinally corresponding wheels of said pairs, and means operated by each of said equalizing devices, upon pivotal movement thereof on said frame, for moving one of said differential mechanisms longitudinally with respect to said frame whereby a substantially uniform separation is maintained between each of said differential mechanisms and the wheels connected thereto.

3. In a motor vehicle, a frame, a plurality of longitudinally extending equalizing devices pivotally mounted on said frame, a plurality of transverse pairs of road wheels, parallel linkage suspensions connecting said transverse pairs of wheels with said devices, a plurality of power transmissions each including differential mechanism and driving members suspended on said frame for movement longitudinally thereof with respect to said devices, means for driving said power transmissions, driving connections between each of said driving members and one of said wheels, and means operated by each of said equalizing devices, upon pivotal movement thereof on said frame, for moving the driving members associated with one of said power transmissions longitudinally with respect to the frame, whereby a substantially uniform separation is maintained between each of said driving members and the wheel connected thereto.

4. In a motor vehicle, a frame, a plurality of longitudinally extending equalizing devices pivotally mounted on said frame, a plurality of transverse pairs of road wheels, parallel linkage suspensions connecting said transverse pairs of wheels with said devices, a plurality of differential mechanisms suspended on said frame for movement longitudinally thereof with respect to said devices, means for driving said differential mechanisms, a plurality of power transmissions each including differential mechanism and driving members suspended on said frame for movement longitudinally thereof with respect to said devices, means including a main differential mechanism connected to the aforesaid differential mechanisms for driving said power transmissions, driving connections between each of said differential mechanisms and one of said transverse pairs of wheels mounted on one of said devices, and means operated by each of said equalizing devices, upon pivotal movement thereof on said frame, for moving one of said differential mechanisms longitudinally with respect to said frame whereby a substantially uniform separation is maintained between each of said differential mechanisms and the wheels connected thereto.

5. In a motor vehicle, a frame, a plurality of longitudinally extending equalizing devices pivotally mounted on said frame, a plurality of transverse pairs of road wheels, parallel linkage suspensions connecting said transverse pairs of wheels with said devices, a plurality of differential mechanisms suspended on said frame for movement longitudinally thereof with respect to said devices, means for driving said differential mechanisms, a plurality of power transmissions each including differential mechanism and driving members suspended on said frame for movement longitudinally thereof with respect to said devices, means including a main differential mechanism connected to the aforesaid differential mechanisms for driving said power transmissions, driving connections between one side of each of said differential mechanisms and longitudinally corresponding wheels of said pairs, driving connections between the other side of each of said differential mechanisms and other longitudinally corresponding wheels of said pairs, and means operated by each of said equalizing devices, upon pivotal movement thereof on said frame, for moving one of said differential mechanisms longitudinally with respect to said frame whereby a substantially uniform separation is maintained between each of said differential mechanisms and the wheels connected thereto.

6. In a motor vehicle, a frame, a plurality of longitudinally extending equalizing devices pivotally mounted on said frame, a plurality of transverse pairs of road wheels, parallel linkage suspensions connecting said transverse pairs of wheels with said devices, a plurality of power transmissions each including differential mechanism and driving members suspended on said frame for movement longitudinally thereof with respect to said devices, means for driving said power transmissions, a plurality of power transmissions each including differential mechanism and driving members suspended on said frame for movement longitudinally thereof with respect to said devices, means including a main differential mechanism connected to the aforesaid differential mechanisms for driving said power transmissions, driving connections between each of said driving members and one of said wheels, and means operated by each of said equalizing devices, upon pivotal movement thereof on said frame, for moving the driving members associated with one of said power transmissions longitudinally with respect to the frame, whereby a substantially uniform separation is maintained between each of said driving members and the wheel connected thereto.

7. In a motor vehicle, a frame, a plurality of fixed pivotal mountings on said frame, longitudinally extending equalizing devices rockably supported on said pivotal mountings, road wheels mounted on said equalizing devices adjacent a free end thereof, power transmissions including driving members suspended on said frame for movement longitudinally thereof with respect to said equalizing devices and means fixed in said frame for driving said members; a direct driving connection between each of said driving members and one of said wheels, and means operated by each of said equalizing devices, upon pivotal movement on its respective pivotal mounting, for moving a driving member associated with one of said transmissions longitudinally with respect to the frame, whereby a substantially uniform separation is maintained between each of said driving members and the wheel directly connected thereto.

8. In a motor vehicle, a frame, a plurality of fixed pivotal mountings on said frame, longitudinally extending equalizing devices rockably supported on said pivotal mountings, road wheels mounted on said equalizing devices adjacent a free end thereof, power transmissions including driving members suspended on said frame for movement longitudinally thereof with respect to said equalizing devices; a differential mechanism movably mounted on said frame for driving a plurality of said members, and means fixed in said frame for driving said differential mechanism; a direct driving connection between each of said driving members and one of said wheels, and means operated by each of said equalizing devices, upon pivotal movement on its respective pivotal mounting, for moving a driving member associated with one of said transmissions longitudinally with respect to the frame, whereby a substantially uniform separation is maintained between each of said driving members and the wheel directly connected thereto.

9. In a motor vehicle, a frame, a plurality of longitudinally extending equalizing devices pivotally mounted on said frame, a plurality of transverse pairs of road wheels, parallel linkage suspensions connecting said transverse pairs of wheels with said devices, power transmissions including driving members suspended on said frame for movement longitudinally thereof with respect to said equalizing devices, means for driving said members, driving connections between each of said driving members and one of said wheels, and means operated by each of said equalizing devices, upon pivotal movement thereof on said frame, for moving the driving members associated with one of said power transmissions longitudinally with respect to the frame whereby a substantially uniform separation is maintained between each of said driving members and the wheels connected thereto.

THEODORE A. PETERMAN.